Figure 1:
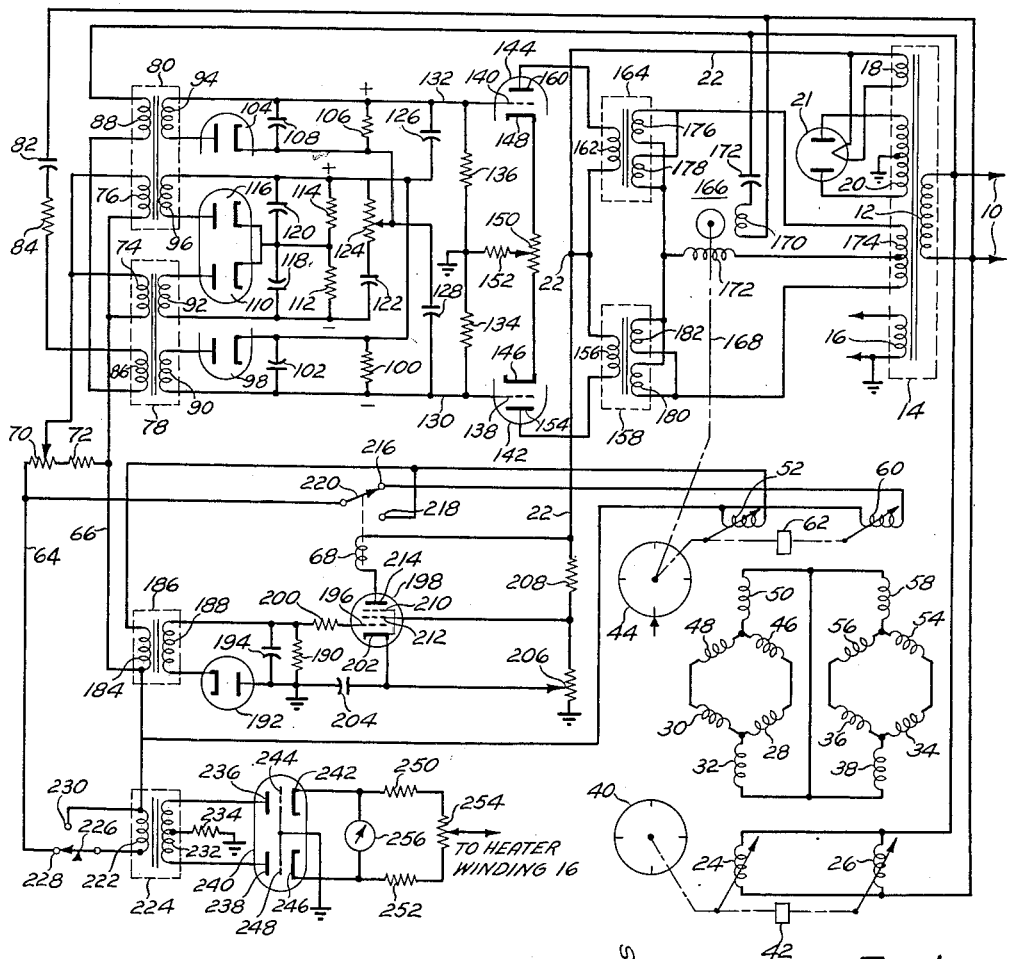

Aug. 8, 1950   J. T. McNANEY   2,518,161
FOLLOW-UP SYSTEM STABILIZING CIRCUIT
Filed June 28, 1945

INVENTOR
JOSEPH T. McNANEY
BY
George Villyrott
AGENT

Patented Aug. 8, 1950

2,518,161

UNITED STATES PATENT OFFICE 2,518,161

FOLLOW-UP SYSTEM STABILIZING CIRCUIT

Joseph T. McNaney, Baltimore, Md., assignor to Bendix Aviation Corporation, South Bend, Ind., a corporation of Delaware Application June 28, 1945, Serial No. 601,952

6 Claims. (Cl. 318—30)

This invention relates to systems in which a load is caused to move in accordance with the operation of a control device and more particularly to such apparatus with improved stabilization of the load in the presence of extraneous influences.

In systems of the nature mentioned, frequently referred to as "servo-" or "follow-up-" systems, the common characteristic is the development of a restoring force proportional to the displacement of the load from its desired final position. If the load device be subjected to external influences tending to cause displacement from its desired relationship to the controlling means, no restoring force is developed until an appreciable displacement has been sent into the system. As a result, conventional follow-up systems suffer the load to be displaced appreciably from its proper relationship to the controlling device prior to the development of a restoring force and one of the objectionable consequences of this fact is a tendency toward hunting or swinging about the neutral point. The suppression of this hunting has, in most systems, been attempted by the insertion of a stimulus in the control loop proportional to the first derivative of the displacement or of the displacement produced stimulus.

It is also desirable in follow-up systems to provide some means for indicating lack of correspondence between the controlling device and the controlled load. When the apparatus is first placed in service after an inoperative period, there may be no correspondence in the position of these two devices, so that a very large displacement voltage appears. When in normal use, however, these two devices are generally substantially in synchronism and displacement voltage falls to a very low value, becoming zero when coincidence is perfect. It is desirable to meter this small residual displacement voltage, conveniently referred to as an "error voltage," and this necessitates an indicating device quite sensitive to small voltages but yet not subject to damage by the higher potentials existing at the moment the apparatus is placed in service.

Accordingly, a primary object of the invention is to provide new and novel follow-up apparatus in which displacement of the controlled load from the position of coincidence by extraneous influences is substantially prevented.

Another object of the invention is to provide a system in which the effective mass may be varied by electrical means.

A further object of the invention is to provide a follow-up system in which hunting is minimized through the use of acceleration control stimuli.

Yet a further object of the invention is to provide new and novel voltage indicating means highly sensitive to small potentials and relatively insensitive to larger potentials.

Still another object of the invention is to provide phase and amplitude sensitive voltage indicating means of the balance type having a limited deflection characteristic.

Figure 2:
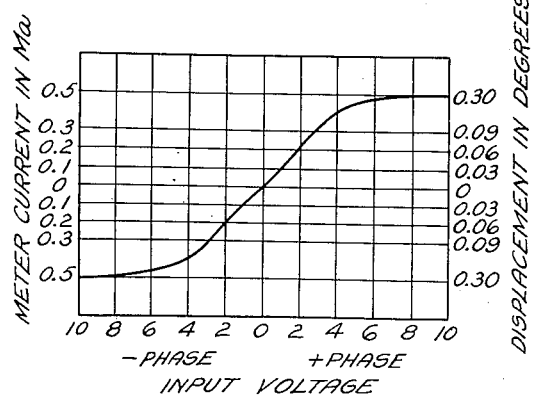

Other objects and advantages of the invention will in part be disclosed and in part be obvious when the specification is read in conjunction with the drawings in which:

Figure 1 is a schematic diagram of a follow-up system embodying the improved stabilizing system and error meter, and Figure 2 is a graph illustrating the deflection characteristic of the error meter as a function of the error voltage amplitude and phase.

The objects and advantages of the invention referred to above are substantially accomplished by the application of an acceleration responsive force to the controlled load with a sense opposing the force producing the initial acceleration. The indicating meter characteristics are secured by a balanced circuit including a pair of electric discharge devices having a substantially constant alternating potential applied to one set of electrodes adjacent an electron emitting cathode and the potential under measurement supplied in outphased relation to anodes situated on the side of said first mentioned electrodes remote from said cathodes.

The indicating meter is disclosed and claimed in my divisional application Serial No. 100,910 filed June 23, 1949 for "Voltage Indicating System."

Referring now to Figure 1, there is shown a complete follow-up system receiving power from a low frequency A. C. supply through the lines 10. The primary 12 of transformer 14 receives energy from the lines 10 transferring it to the various secondaries. Secondary 16 has one terminal grounded and supplies heating energy to the heaters of the various tubes in the apparatus incorporating thermionic cathodes. The heaters and circuit connections for supplying energy thereto are omitted in the description since they are well known in the art, and some measure of simplification is achieved thereby. Secondary 18 of the transformer 14 energizes the filament of the full-wave rectifier 21 having its anodes connected to either end of the center tapped secondary 20. The tap of secondary 20 is grounded, thus establishing ground as the negative source of anode potential for the other tubes in the equipment, and a lead 22 serving as the positive high voltage bus is brought out from one side of secondary 18 to distribute positive anode potential for the remaining tubes.

The power line 10 also supplies energy to the rotatable primary windings 24 and 26 of the self-synchronous transformer assemblies having associated secondaries 28, 30, 32 and 34, 36, 38 respectively. The rotatable primary 24 is directly coupled to the controller or director indicated at 40, while the rotor 26 is coupled thereto through transmission gearing 42, stepping up the number of rotations made by it with reference to the director rotation by a factor of 36. The secondary windings of the respective director responsive synchronous transformers are star connected and have their terminals connected to the similarly star connected self-synchronous transformers associated with the load indicated at 44, winding 28 being connected to winding 46, winding 30 being connected to winding 48, and winding 32 to winding 50. The rotatable secondary 52 directly coupled to the load 44 is situated in the common field of the last three mentioned windings and serves to complete what may be conveniently called the single speed displacement signal system. Accurate positioning is secured by the use of the associated multiple speed displacement signal system having associated with the load the primary windings 54, 56 and 58 star connected, and their free terminals respectively attached to windings 34, 36 and 38 of the multiple speed director self-synchronous transformer. The rotatable secondary winding 60 of the multiple speed load self-synchronous unit is located in the common field of windings 54, 56 and 58 and coupled to the load 44 through the step up transmission gearing 62 having, as before indicated, a ratio of 36:1.

In the event that perfect coincidence between the load director and the load 44 does not exist, there will appear across the windings 52 and 60 a voltage fixed by the magnitude of the displacement between the field generating rotors associated with the director 40 and the signal pick-up rotors associated with the load 44. Depending upon the magnitude of the displacement or error voltage, one or the other of the two controller rotors 52, 60 is connected to the displacement signal lines 64, 66 through the contacts of relay 68. A sensitivity control 70 is connected across the displacement signal lines 64, 66 in series with a resistor 72 fixing the minimum sensitivity. The primaries 74, 76 of transformers 78, 80 respectively are connected in parallel to the line 66 and the movable tap on sensitivity adjusting potentiometer 70.

To determine the sense of the displacement as well as its magnitude, it is necessary to supply transformers 78 and 80 with reference energy to combine with the displacement signal. This reference energy is supplied from the power lines 10 in series with the capacitor 82 and resistor 84 and flows through the series connected primaries 86 and 88 of transformers 78 and 80. It will be noted that one of the primaries 86, is reversed in phase with respect to primary 88. The purpose of the insertion of capacitor 82 and resistor 84 is to permit adjustment of the phase of the current traversing the reference primaries 86 and 88 to exact phase coincidence or opposition with that passing through the displacement signal primaries 74 and 76. Transformer 78 is provided with two secondaries, secondary 90 supplying the displacement signal circuit and secondary 92 supplying the acceleration signal circuit. Transformer 80 is likewise provided with two secondaries, secondary 94 supplying the displacement signal circuit and secondary 96 energizing the acceleration signal circuit. The voltage appearing across displacement secondary 90 is rectified in the diode 98 to develop across the associated resistor 100 a voltage increasing for displacement in a first sense and decreasing for displacement in a second sense. The capacitor 102 shunting resistor 100 serves as a smoothing capacitor.

The voltage in displacement secondary 94 is rectified in diode 104 to provide across resistor 106 a voltage decreasing for displacement in said first sense and increasing for displacement in said second sense. Capacitor 108 again serves to smooth the otherwise discontinuous half-wave rectified voltage. It will be noted that the cathode terminals of resistors 100 and 106 are each positive and that voltages appearing thereacross are in opposition. The acceleration secondary 92 delivers output to the diode 110 developing a voltage across resistor 112 varying similarly to that across resistor 100 but, conveniently, of twice the magnitude. The voltage in acceleration secondary 96 is applied to resistor 114 through the diode 116 to develop voltages similarly relayed to those appearing across the resistor 106. Capacitors 118 and 120 serve as filter or smoothing capacitors across resistors 112 and 114 respectively. Resistors 112 and 114 are series connected so that the voltages appearing thereacross are in opposition, and there is connected across their output terminals the series combination of capacitor 122 and resistor 124, the free terminal of resistor 124 being connected to the negative end of resistor 114. The negative end of resistor 114 is additionally connected to the negative end of resistor 106 through capacitor 126 and to the positive terminal of resistor 100. Resistor 124 is incorporated in a potentiometer having a movable tap and this movable tap is connected to the negative terminal of resistor 100 through capacitor 128 and to the positive terminal of resistor 106.

The system thus far described develops across the line terminals 130, 132 a signal responsive both to the load displacement and to the load acceleration, with respect to the controller. This voltage is rendered symmetrical with respect to ground by the series connected resistors 134 and 136 between lines 130 and 132, the common junction of resistor 134 and 136 being grounded. The ungrounded terminals of resistors 134 and 136 are connected respectively to the control grids 138 and 140 of the high vacuum triode valves 142 and 144, having their respective cathodes 146 and 148 connected to opposite terminals of the potentiometer 150 whose movable tap is connected to ground through resistor 152. The anode 154 of the triode 142 is connected through the D. C. winding 156 of the saturable reactor 158 to the positive anode bus 22 and the anode 160 of the triode 144 is connected through the D. C. winding 162 of the saturable reactor 164 to said positive anode bus 22.

The saturable reactors 158 and 164 are connected in a circuit controlling the two phase motor 166 coupled to the load 44 by the mechanical link 168. One winding, 170, of the motor 166 is energized from the power input line 10 through a capacitor 172 inserted to permit phase adjustment for the optimum torque characteristic. The other winding, 172, receives energy from the secondary winding 174 of power transformer 14 in series with the A. C. windings of the saturable reactors. Winding 174 is center tapped and has one outside terminal connected to the paralleled A. C. windings 176, 178 of saturable reactor 164, while the other outside terminal is connected to the paralleled A. C. windings 180 and 182 of the saturable reactor 158. The circuit through the motor winding 172 is then completed by the connection of one terminal to the center tap of secondary 174 and the other terminal to each of the remaining free terminals of the A. C. windings of the individual saturable reactors. With no displacement signal input to the transformers 78 and 80, the voltage across resistor 100 cancels that appearing across resistor 106 and that across resistor 112 cancels that across resistor 114, so that no voltage appears across lines 130, 132. There is thus no input signal for the triodes 142 and 144 and for this condition the position of the tap on potentiometer 150 is adjusted to secure equal impedance on the A. C. sides of the saturable reactors 158 and 164, so that no current flows through motor winding 172 and the load 44 remains undisturbed.

In the event that, due to actuation of, say, the director 40, a displacement voltage appears in the input to transformers 78 and 80, the voltage across resistor 106 will, for the assumed displacement sense, decrease, while that across resistor 100 increases, causing the differential changes of the polarity indicated in Figure 1, line 132 becoming positive with reference to line 130, so that the current flowing through triode 144 increases, while that flowing through triode 142 decreases, decreasing the A. C. impedance of saturable reactor 164 with respect to that of saturable reactor 158, energizing motor 166 to drive the load 44 in such a direction as to re-establish coincidence with the director 40.

Should the director 40 and load 44 be in coincidence and an extraneous force tend to displace load 44 in a sense which would develop voltages indicated in Figure 1, there will, of course, be no appreciable restoring force developed until the total displacement has become fairly large. The voltage across resistors 112 and 114 does, however, due to its greater magnitude, change more rapidly and in consequence of the differentiating action of condenser 122, a voltage proportional to the first derivative of the displacement appears across potentiometer 124. By virtue of the series connection of resistors 106, 124 and 100 the first derivative voltage is combined with displacement voltage across resistors 106 and 100. The connections between resistor 124 and the resistors 106 and 100 are such that the first derivative voltage is applied across the latter resistors in the inverse of its normal sense. That is, where displacement in a given direction is considered positive and displacement is increasing in that direction the first derivative would be positive. But by the circuit connections shown the first derivative voltage is applied in opposition to an increasing displacement voltage. This voltage is also impressed on resistor 106 through capacitor 126 to make the terminal of resistor 106 connected to line 132 positive, the exact magnitude of the positive voltage being in turn fixed by the derivative of the voltage across potentiometer 124. This additional voltage appearing across resistor 106 is thus proportional to the second derivative of the displacement voltage. A similar voltage is impressed on resistor 100 through capacitor 128 in a sense making that terminal of resistor 100 connected to the line 130 negative. It is thus apparent that there will be immediately exerted on the load through the action of the control train and the motor 166 a force opposing whatever stimulus it was that produced the initial acceleration from the desired position of coincidence. This is equivalent to an increase in mass, as will be most apparent from a brief mathematical exposition.

In follow-up systems there is developed a restoring torque having a sense tending to restore the load to its desired position, which is to say that the force opposes the displacement. This torque may be conveniently designated:

$$-K_1\alpha \qquad (1)$$

Connected with the movement of all objects is a frictional force which, as is well known, always opposes the motion and for that reason may be conveniently designated $$-K_2\frac{d\alpha}{dt} \qquad (2)$$

Moving systems may be regarded as acted upon by what is termed an inertia force determined by the mass and radius of gyration or moment of inertia of the moving system. This may conveniently be expressed, since it always opposes the acceleration, as $$-K_3\frac{d^2\alpha}{dt^2} \qquad (3)$$

Now the net force on the system, after the removal of the displacing stimulus, is zero, so that the motional equation becomes $$T=0=-K_1\alpha-K_2\frac{d\alpha}{dt}-K_3\frac{d^2\alpha}{dt^2} \qquad (4)$$

where $K_3$ is a constant proportional to mass and radius of gyration of the rotating system.

In the circuits above described, there is added an additional torque oppositely sensed with respect to the acceleration, which may be expressed as $$-K_4\frac{d^2\alpha}{dt^2} \qquad (5)$$

The motional equation is now $$-K_1\alpha-K_2\frac{d\alpha}{dt}-(K_3+K_4)\frac{d^2\alpha}{dt^2}=0 \qquad (6)$$

which upon examination shows that the introduction of this electrically inserted factor is equivalent to increasing the mass involved. By carrying this process sufficiently far, the effective mass of a relatively light object may be made so great as to achieve substantial independence from the effects of extraneously applied disturbances.

In the presentation of circuit details and operation thus far, simplicity has demanded the omission of a discussion of the selecting circuit connected to the single speed and multiple speed self-synchronous transformers. As is well known, two voltage nulls per revolution are observed in such units, one of which is the stable null towards which the apparatus is normally driven in follow-up systems, while the other is an unstable null in that the apparatus will be driven away from this position upon the slightest deviation. When transmission gearing step-up is introduced for the purpose of increasing the follow-up accuracy, a 36-fold ambiguity is possible between the position of director and load. The combined requirements of accuracy and freedom from ambiguity are satisfied in a system relying on a single speed self-synchronous transformer to eliminate ambiguity and a multiple speed unit to provide the required accuracy. The additional circuit features to be described shortly insert one or the other of these units into the follow-up circuit according to the function to be performed. The signal initiating the switching operation for the insertion of one or the other displacement signal generating systems is derived from the single speed rotor 52 connected to the terminals of primary 184 of the synchronizing input transformer 186. The voltage appearing in the secondary 188 of transformer 186 is applied to the resistor 190 through the diode rectifier 192. There is thus developed across resistor 190 a unidirectional voltage having a magnitude controlled by the output of the single speed self-synchronous transformer. The A. C. component in the output of diode 192 is removed by the filter capacitor 194. The negative terminal of resistor 190 is connected to the ground and the positive terminal is connected to the control grid 196 of the pliotron 198, in series with resistor 200, which serves to limit the grid current in the presence of abnormally high voltages. The cathode 202 of pliotron 198 is grounded for A. C. voltages by capacitor 204 and, for direct currents is connected to the movable tap on biasing potentiometer 206 having one terminal connected to ground and the other connected to the high voltage bus 22 through resistor 208. The suppressor grid 210 is connected to the cathode 202, as is customary, and the screen 212 is energized from the common connection of potentiometer 206 and resistor 208. The anode 214 of the pliotron 198 is connected directly to the high voltage bus through operating winding of synchronizing relay 68. The synchronizing relay 68 is provided with a back contact 216 connected to the rotor of the multiple speed self-synchronous transformer and front contact 218 connected to the rotor of the single speed self-synchronous transformer. The movable contact 220 of relay 68 which engages with the front contact 218 when current flows in the operating winding and the back contact 220 in the absence of such current flow, is connected to the displacement signal line 64. The terminals of the self-synchronous rotor windings not connected to the relay contacts are connected together and to the displacement signal line 66. The setting of the movable tap on biasing potentiometer 206 is such that, in the absence of any voltage across resistor 190, the anode current of pliotron 198 is reduced substantially to zero.

It is thus apparent that in the absence of signal output from the winding 52, or in the event that such signal output is less than a critical value as determined by the position of the tap on biasing potentiometer 206, no voltage is developed across the resistor 190 and no current flows through the operating winding of relay 68, so that movable contact 220 engages back contact 216 to connect the multiple speed self-synchronous transformer to the displacement signal line 64 and provide great rigidity of control. Should the load and director units be out of coincidence to an extent establishing an ambiguous null in the output of rotor winding 60, the rotor winding 52 will, by virtue of the intermediate mechanical linkage, have been rotated, in the case of 36:1 speed ratio, ten degrees and develops a voltage resulting in the application of a rectified positive potential to the control grid 196 of the pliotron 198, causing current to flow in the operating winding of relay 68 and drawing the movable contact 220 into engagement with front contact 218 connecting one terminal of the rotor winding 52 to the displacement signal line 64, thereby energizing the follow-up system from the single speed self-synchronous transformer to drive the system to a point where the ambiguity is eliminated.

In follow-up systems involving control of large and heavy loads it is not infrequent that some time is required for the load to move into coincidence with the director. This may be true even in the case of relatively small loads when the herein described method of increasing the effective mass of the load is employed. Where it is important that certain readings are to be relied on only when precise coincidence has been established, some means of indicating lack of coincidence is to be desired, and in the circuit of Figure 1 this is provided by the error meter assembly having one terminal of its primary winding 222 of its input transformer 224 connected to the displacement signal line 66 and the other terminal of transformer primary 222 connected to the movable contact 226 of a single pole, double throw switch with fixed contacts 228 and 230. Contact 228 is connected to displacement signal line 64 while the contact 230 is connected to displacement signal line 66. Hence when movable contact 226 engages contact 228, the primary 212 is connected directly across the displacement signal lines 64 and 66 and when contact 226 engages contact 230 the primary is short-circuited upon itself for a purpose to be later apparent. Error meter transformer 224 has a center tapped secondary winding 232, the center tap of which is connected to ground through a resistor 234, which may conveniently be rather high in value, for example, three megohms. The end terminals of secondary 232 therefore develop symmetrically outphased voltages with respect to ground, which are applied to the anodes 236 and 238 of the dual triode 240. An emissive cathode 242 and intermediate cold grid electrode 244 are associated with anode 236 and another emissive cathode 246 and intermediate cold grid electrode 248 are associated with anode 238. The intermediate electrodes 244 and 248 may be connected to ground as shown, while the cathodes 242 and 246 are respectively connected through resistors 250 and 252 to the end terminals of potentiometer 254 whose movable tap is connected to the ungrounded terminal of winding 16, supplying heater potentials for the various thermionic tubes employed in the apparatus. An indicating meter 256 which may be of the zero-center type is connected between cathodes 242 and 246.

The voltage of winding 16 is thus impressed cophasely between the electrodes 244, 248 and the cathodes 242, 246. In initially adjusting the apparatus, the movable contact of switch 226 is placed in engagement with contact 230, short-circuiting the primary 222 of error input transformer 224 and the tap on potentiometer 254 adjusted for zero deflection of the meter 256. This is possible because of the similar parallel paths presented to the current flowing from winding 16 through the two grid-cathode space discharge paths of the dual triode 240. The movable contact 226 of the single pole, double throw switch is now moved to a position engaging contact 228, thus connecting primary 222 across the displacement signal lines 64 and 66, the voltage in which is substantially either in phase coincidence or phase opposition with that on the grid electrodes depending upon the sense of the displacement between the director and the load.

If it now be assumed that the phase of the displacement voltage is such that anode 236 becomes negative at the time when grid electrode 244 becomes positive with respect to cathode 242, the electric field produced by anode 236 penetrates the mesh of grid 244 diminishing the electron flow thereto. The converse effect is produced at cathode 246, in increasing current at this point resulting. Since the current flow in resistor 250 is now less than that in 252, the previously balanced system becomes unbalanced, impressing a voltage across the indicating meter 256 showing that displacement is present and indicating its sense. A reversal in phase of voltage on displacement signal lines 64 and 66 will result in a reversal of the deflection sense of the indicator 256. It is apparent that when the voltage on either anode swings negative at the time when its associated grid electrode is driven positive, it can do no more than reduce the previously flowing current to zero, thus setting a limit to change in this direction. In the converse case, at the moment the anode begins to draw current, substantially the full output voltage of the transformer appears across resistor 235, decreasing the anode voltage and thus setting an upper limit of current variation which may be secured. A typical deflection characteristic for the meter 256 in terms of input voltage is shown in Figure 2, the maximum and minimum limits of deflection appearing clearly. It is obvious that in the foregoing analysis only events occurring at such periods as the electrodes 244 and 248 are positive with respect to their associated cathodes need be considered, since when these electrodes are negative, no current will flow to them and the current flowing in the anode circuit is negligible, by virtue of the high resistance 234. Further, the effect of negative voltage on these electrodes 244 and 248 will be to cut off completely all anode current flow.

Summarizing, there has now been described a follow-up system obtaining great accuracy and freedom from ambiguity through the use of geared self-synchronous transformers operating at different speeds with a selector for inserting one or the other according to whether the accuracy or non-ambiguity requirement is to be satisfied. An acceleration controlled force is applied to the load to thereby vary its effective mass or moment of inertia to impart desirable displacement characteristics to the system. In addition, there is shown an error meter adapted for connection to the displacement signal line affording high sensitivity in the low signal region with diminishing sensitivity in the presence of large displacement signals.

It will be obvious that any changes and modifications may be made in the invention without departing from the spirit thereof as expressed in the foregoing discussion and in the appended claims.

I claim:

1. In a control system, adjustable control means, controlled means, motor means in driving relationship with said controlled means, means responsive to the sense and magnitude of a direct current signal for controlling the operation of said motor means, means developing an alternating current signal corresponding in sense and magnitude to the instantaneous displacement of said controlled and control means, means comparing the phase and magnitude of said alternating current signal with a reference wave of like frequency and deriving from said comparison a first direct current signal having a sense and magnitude which is a function of the sense and magnitude of said instantaneous displacement, means deriving from said comparison a second direct current signal the sense and magnitude of which are functions of the sense and magnitude of the rate of change of said displacement, means deriving from said comparison a third direct current signal the sense and magnitude of which are functions of the rate of change of said second direct current signals, means combining said direct current signals and applying the combined signals to said motor controlling means in a manner to reduce said displacement, said combining means combining said direct current signals so that said second direct current signal opposes said first and third direct current signals when said displacement is increasing.

2. In a control system, adjustable control means, controlled means, motor means in driving relationship with said controlled means, means responsive to the sense and magnitude of a direct current signal for controlling the operation of said motor means, means developing an alternating current signal corresponding in sense and magnitude to the instantaneous displacement of said controlled and control means, a pair of transformers, means applying said alternating current signal to each of said transformers, means applying to each of said transformers a reference voltage, said reference voltages being of identical frequency and magnitude but of opposite phase, a first pair of rectifying means each rectifying the output of one of said transformers, means combining the outputs of said rectifying means to produce a direct current signal the sense and magnitude of which are functions of the sense and magnitude of said displacement, a second pair of rectifying means each rectifying the output of a respective one of said transformers, a first differentiating network, means applying the outputs of said second pair of rectifying means to said differentiating network in an opposing sense, a second differentiating network, means applying the output of said first differentiating network to said second differentiating network and combining the output of said second differentiating network with the combined output of said first pair of rectifying means and means applying said combined outputs to said motor controlling means in a sense to reduce the magnitude of said displacement.

3. In a control system comprising an adjustable control means, a controlled means, motor means in driving relationship with said controlled means, means responsive to the sense and magnitude of a direct current signal for controlling the operating of said motor means and means developing an alternating current signal corresponding in sense and magnitude to the instantaneous displacement of said controlled and control means, the improvement which comprises: means comparing the phase and magnitude of said alternating current signal with a reference wave of like frequency and deriving from said comparison a first direct current signal having a sense and magnitude which is a function of the sense and magnitude of said instantaneous displacement, means deriving from said comparison a second direct current signal the sense and magnitude of which are functions of the sense and magnitude of the rate of change of said displacement, means deriving from said comparison a third direct current signal the sense and magnitude of which are functions of the rate of change of said second direct current signal, means combining said direct current signals so that said second direct current signal opposes said first and third direct current signals when said displacement is increasing.

4. In a control system which comprises an adjustable control means, a controlled means, motor means in driving relationship with said controlled means, means responsive to the sense and magnitude of a direct current signal for controlling the operation of said motor means and means developing an alternating current signal corresponding in sense and magnitude to the instantaneous displacement of said controlled and control means, the improvement which comprises: a pair of transformers, means applying said alternating current signal to each of said transformers, means applying to each of said transformers a reference voltage, said reference voltages being of identical frequency and magnitude but of opposite phase, a first pair of rectifying means each rectifying the output of one of said transformers, means combining the outputs of said rectifying means to produce a direct current signal the sense and magnitude of which are functions of the sense and magnitude of said displacement, a second pair of rectifying means each rectifying the output of a respective one of said transformers, a first differentiating network, means applying the outputs of said second pair of rectifying means to said differentiating network in an opposing sense, a second differentiating network, means applying the output of said first differentiating network to said second differentiating network and combining the output of said second differentiating network with the combined output of said first pair of rectifying means and means applying said combined outputs to said motor controlling means in a sense to reduce the magnitude of said displacement.

5. In a control system, adjustable control means, controlled means, motor means in driving relationship with said controlled means, means responsive to the sense and magnitude of a direct current signal for controlling the operation of said motor means, said motor controlling means comprising a circuit including a pair of saturable reactors connected with a winding of said motor means in a manner such that the relative impedance of said saturable reactors controls the direction and speed of rotation of said motor means, means developing an alternating current signal corresponding in sense and magnitude to the instantaneous displacement of said controlled and control means, means comparing the phase and magnitude of said alternating current signal with a reference wave of like frequency and deriving from said comparison a first direct current signal having a sense and magnitude which is a function of the sense and magnitude of said instantaneous displacement, means deriving from said comparison a second direct current signal the sense and magnitude of which are functions of the sense and magnitude of the rate of change of said displacement, means deriving from said comparison a third direct current signal the sense and magnitude of which are functions of the rate of change of said second direct current signal, means combining said direct current signals and applying the combined signals to said saturable reactors in a sense to cause said motor to drive said controlled means toward coincidence with said control means, said combining means combining said direct current signals so that said second direct current signal opposes said first and third direct current signals when said displacement is increasing.

6. In a control system, adjustable control means, controlled means, motor means in driving relationship with said controlled means, means responsive to the sense and magnitude of a direct current signal for controlling the operation of said motor means, said motor controlling means comprising a circuit including a pair of saturable reactors connected with a winding of said motor means in a manner such that the relative impedance of said saturable reactors controls the direction and speed of rotation of said motor means, means developing an alternating current signal corresponding in sense and magnitude to the instantaneous displacement of said controlled and control means, a pair of transformers, means applying said alternating current signal to each of said transformers, means applying to each of said transformers a reference voltage, said reference voltages being of identical frequency and magnitude but of opposite phase, a first pair of rectifying means each rectifying the output of one of said transformers, means combining the outputs of said rectifying means to produce a direct current signal the sense and magnitude of which are functions of the sense and magnitude of said displacement, a second pair of rectifying means each rectifying the output of a respective one of said transformers, a first differentiating network, means applying the outputs of said second pair of rectifying means to said differentiating network in an opposing sense, a second differentiating network, means applying the output of said first differentiating network to said second differentiating network and combining the output of said second differentiating network with the combined output of said first pair of rectifying means and means applying said combined outputs to said saturable reactors in a sense to cause said motor to drive said controlled means toward coincidence with said control means.

JOSEPH T. McNANEY.

REFERENCES CITED

The following references are of record in the file of this patent:

UNITED STATES PATENTS

| Number | Name | Date |
|---|---|---|
| 1,703,280 | Minorsky | Feb. 26, 1929 |
| 1,988,458 | Minorsky | Jan. 22, 1935 |
| 2,088,654 | Hull | Aug. 3, 1937 |
| 2,233,415 | Hull | Mar. 4, 1941 |
| 2,281,995 | Purington | May 5, 1942 |
| 2,324,215 | Kinsburg | July 13, 1943 |
| 2,409,970 | Agins | Oct. 22, 1946 |
| 2,424,568 | Isbister et al. | July 29, 1947 |